(12) United States Patent
Merciano

(10) Patent No.: US 10,685,320 B1
(45) Date of Patent: Jun. 16, 2020

(54) SELF-CLEANING APPARATUS THAT UPDATES USERS REGARDING INVENTORY SUPPLIES IN REAL-TIME

(71) Applicant: Lamarco Merciano, Miami, FL (US)

(72) Inventor: Lamarco Merciano, Miami, FL (US)

( * ) Notice: Subject to any disclaimer, the term of this patent is extended or adjusted under 35 U.S.C. 154(b) by 179 days.

(21) Appl. No.: 15/589,717

(22) Filed: May 8, 2017

(51) Int. Cl.
*G06Q 10/08* (2012.01)
*B08B 9/08* (2006.01)
*A47J 31/60* (2006.01)

(52) U.S. Cl.
CPC ............ *G06Q 10/087* (2013.01); *B08B 9/08* (2013.01); *A47J 31/60* (2013.01); *A47J 31/605* (2013.01)

(58) Field of Classification Search
CPC .......... G06Q 10/08; G05B 2219/31319; G07F 9/02; G01G 19/021; G01G 19/024; G01G 19/027; G01G 19/042; G01G 19/047; G01G 19/10; G01G 19/12; G10G 19/035
USPC ............................................. 15/320; 705/28
See application file for complete search history.

(56) References Cited

U.S. PATENT DOCUMENTS

| 10,064,502 B1* | 9/2018 | Gyori ........................ A47F 5/16 |
| 2015/0196182 A1* | 7/2015 | Hekman ............... A47L 7/0033 134/10 |
| 2018/0092505 A1* | 4/2018 | Simon .................. A47L 15/4212 |

FOREIGN PATENT DOCUMENTS

DE    4136923  A1 *  5/1993   .............. A47J 31/60

OTHER PUBLICATIONS

Franklin, A. (n.d.). Digital Weight-Sensing Shelves Are Moving Vending Into The 21st Century. Retrieved Jan. 26, 2014, from https://www.vendingtimes.com/articles/digital-weightsensing-shelves-are-moving-vending-i-1839?iid=4AADA7CB3F9C451E86D6D703A9996148. (Year: 2014).*

* cited by examiner

*Primary Examiner* — Asfand M Sheikh
*Assistant Examiner* — Avia Salman
(74) *Attorney, Agent, or Firm* — Sanchelima & Associates, P.A.; Christian Sanchelima, Esq.; Jesus Sanchelima, Esq.

(57) ABSTRACT

A method and system for monitoring goods placed in compartments of an inventory apparatus and communicating monitored data to user-computing device via a communication network. The method includes storing information pertaining to goods into a database. The method further includes integrating weighing scales at the bottom of each of the one or more compartment. Further, the method includes determining the weight of the one or more goods in each of the one or more compartment through the weighing scales and transmitting the weighed information to the database via the communication network. The method further includes the monitoring the quantitative value and inventory level of one or more goods placed in the one or more compartments through one or more sensors. Furthermore, the method includes the displaying the weighed information and monitored information over the user-computing device communicated through the communication network.

7 Claims, 4 Drawing Sheets

SELF-CLEANING APPARATUS THAT UPDATES USERS REGARDING INVENTORY SUPPLIES IN REAL-TIME

TECHNICAL FIELD

The presently disclosed embodiments are related, in general, to inventory management. More particularly, the presently disclosed embodiments are related to a method and system for monitoring one or more goods placed in a plurality of compartments of an inventory apparatus and further communicating the monitored data to a user-computing device.

BACKGROUND

Consumer Packaged Goods (CPG) and Fast-moving Consumer Goods (FCG) have gained unprecedented dependence in the modern times. CPG and FCG are the goods that are the result of production and are ready for consumption by the user. Unlike the other Consumer Goods (like Automobiles, Jewelry, electrical appliances and the like) which can be stored over a long period, CPG and FCG have a comparatively shorter shelf life and sold more frequently. The CPG and FCG are stored in compartments in the shops, markets and the like to ease the classification of the goods and products before offering the goods for sale. Due to high demand and sale of the CPG and FCG, the stocks may be exhausted easily and it becomes necessary to maintain the stocks and sales inventory of the CPG and FCG.

Typically, inventory management systems used to manage the inventory of an entity such as a business. The existing manual monitoring methods of inventories are not reliable. The goods are segregated and further stored in various compartments of the inventories and shops. When the goods in a particular compartment are exhausted, it is manually noted and then the stocks get refilled. This result in inconvenience to the customers due to unavailability of the stocks. Further, the manual monitoring of the compartment inventory causes delay in ordering the fresh stocks of the goods and in-turn availability of the goods to the customer.

Another method of compartment inventory monitoring is by affixing the stickers having optical codes on the goods. Goods classified as the given codes and the corresponding sticker with optical codes affixed to the goods. Goods are scanned using optical scanners at the time of billing the goods. The goods so scanned reduces the number of such goods from the inventory and shows the number of goods available in stock. However, the availability of each individual goods to be searched manually. Further, the availability of the goods not known unless compartments are empty or the database checked manually.

Further, there is a need for a method to update the shopkeeper about the stock of the goods in real-time. The delay in manually checking the inventory details and the ordering of fresh stock needs to be reduced. The undue delay of time between the exhaustion of the stocks and the ordering of fresh stocks needs to be reduced. Thus, there is a need for a system of reporting when the stocks are about to get exhausted while there is still availability of the goods.

Further limitations and disadvantages of conventional and traditional methods and compositions will become apparent to one of skill in the art, through comparison of described methods and compositions with some aspects of the present disclosure, as set forth in the remainder of the present application and with reference to the drawings.

SUMMARY

A method and system for monitoring one or more goods placed in a plurality of compartments of an inventory apparatus and further communicating the monitored data to a user-computing device via a communication network provided substantially as shown in, and/or described in connection with, at least one of the figures.

According to embodiments illustrated herein, there is provided a method for monitoring one or more goods placed in a plurality of compartments of an inventory apparatus and further communicating the monitored data to a user-computing device via a communication network. The method includes storing information pertaining to one or more goods into a database. In one embodiment, the information pertaining to one or more goods including, but not limited to, the location of one or more compartment in which the goods are stored, weight of goods, and number of goods available in stock.

The method further includes integrating weighing scales at the bottom of each of the one or more compartment. Further, the method includes determining the weight of the one or more goods in each of the one or more compartment through the weighing scales and transmitting the weighed information to the database via the communication network. The method further includes the monitoring the quantitative value and inventory level of one or more goods placed in the one or more compartments through one or more sensors. Furthermore, the method includes displaying the weighed information and monitored information over the user-computing device communicated through the communication network.

According to embodiments illustrated herein, there is provided a system that comprises an application server to monitor one or more goods placed in plurality of compartments of an inventory apparatus and further communicating the monitored data to a user-computing device via a communication network.

The application server further includes a processing unit. The processing unit is configured to an application server to store information pertaining to one or more goods into a database. In an embodiment, the information pertaining to one or more goods including, but not limited to, the location of one or more compartment in which the goods are stored, weight of goods, and number of goods available in stock.

Then the one or more processing unit is configured to affix weighing scales at the bottom of each of the one or more compartment. The one or more processing unit is further configured to determining the weight of the one or more goods in each of the one or more compartment through the weighing scales and transmitting the weighed information to the database via the communication network. The one or more processing unit is further configured to monitoring the quantitative value and inventory level of one or more goods placed in the one or more compartments through one or more sensors. The one or more processing unit is further configured to display the weighed information and monitored information over the user-computing device communicated through the communication network.

These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions

The following terms shall have, for the purposes of this application, the respective meanings set forth below.

"Inventory" refers to the complete list, listing, catalogue, tally, checklist of the goods. In an embodiment, inventory refers to the complete list of the one or more goods stocked in the one or more compartments and also includes the complete list of the one or more goods in stock. The type of goods can range from food products to repair parts, etc.

"User" refers to the person who uses the user-computing device. In an embodiment, user refers to the person offers the one or more goods for sale to the customer and to whom the real-time updates are sent about the inventory stock.

Figure 1:
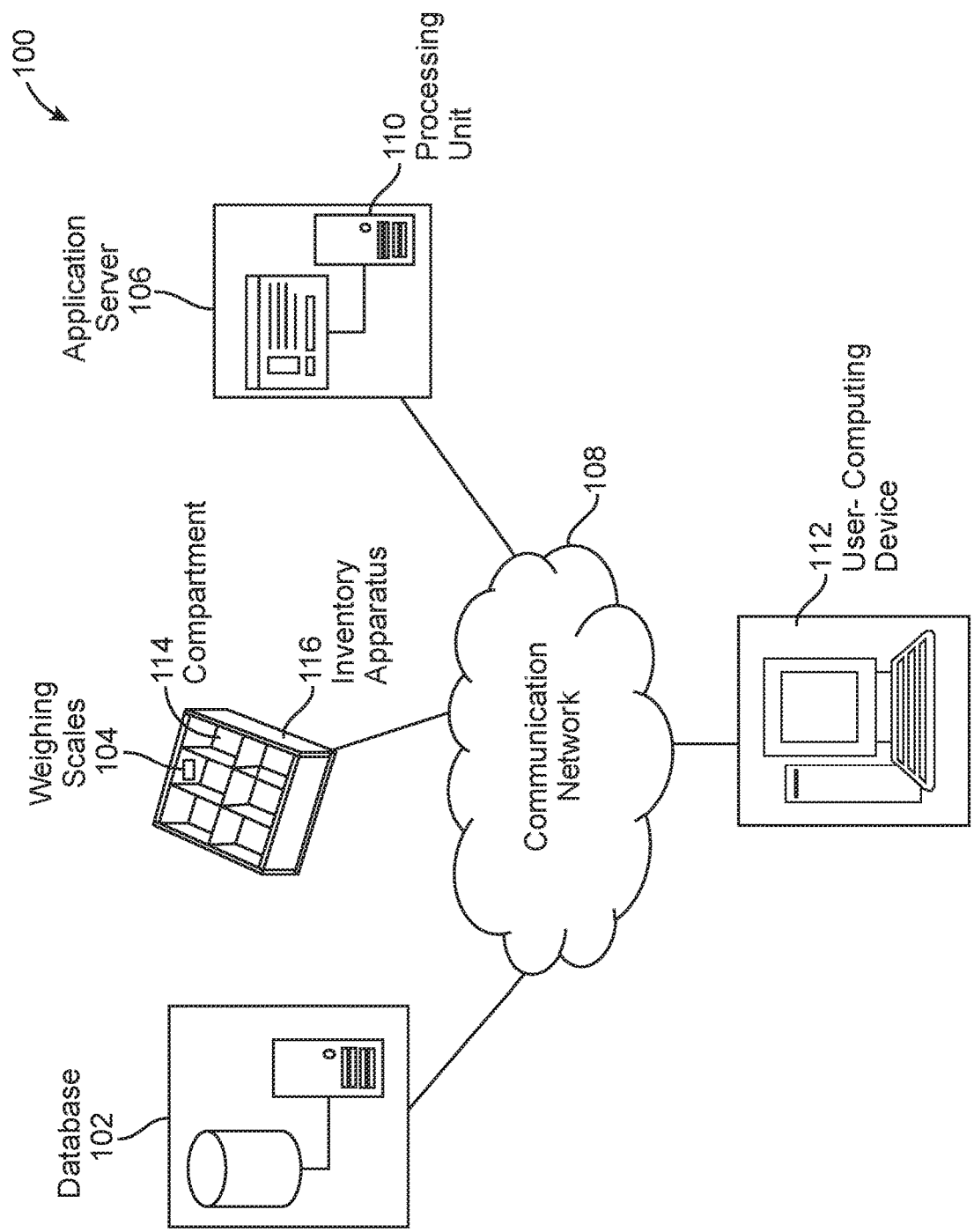
FIG. 1 is a block diagram that illustrates an application server configured to monitor one or more goods placed in plurality of compartments of an inventory apparatus and further communicating the monitored data to a user-computing device via a communication network, in accordance with at least one embodiment.

FIG. 1 illustrates a block diagram 100 that of an application server 106 configured to monitor one or more goods (not shown in FIG. 1) placed in plurality of compartments 114 of an inventory apparatus 116 and further communicating the monitored data to a user-computing device 112 via a communication network 108, in accordance with at least one embodiment, in accordance with at least one embodiment.

In an embodiment, the communication network 108 includes a medium through which a database 102, one or more user computing devices 112, the application server 106, and the inventory apparatus 116 communicate with each other. Such a communication is performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 108 includes, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the application server 106 includes a processing unit 110. The processing unit 110 is implemented based on a number of processor technologies known in the art. Examples of the processing unit 110 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

In an embodiment, the application server 106 refers to a computing device or a software framework hosting an application or a software service. In an embodiment, the application server 106 is implemented to execute procedures such as, but not limited to, programs, routines, or scripts stored in one or more memories for supporting the hosted application or the software service. In an embodiment, the hosted application or the software service is configured to perform one or more predetermined operations. The application server 106 is realized through various types of application servers such as, but not limited to, a Java application server, a .NET framework application server, a Based application server, a PHP framework application server, or any other application server framework.

The processing unit 110 is configured to an application server 106 to store information pertaining to one or more goods into a database 102. In an embodiment, the information pertaining to one or more goods including, but not limited to, the location of one or more compartment 114 in which the goods are stored, weight of goods, and number of goods available in stock, nomenclature, national stock number, part number, and count of goods if packaged.

Then the one or more processing unit 110 is configured to affix weighing scales 104 at the bottom of each of the one or more compartment 114. The one or more processing unit 110 is further configured to determining the weight of the one or more goods in each of the one or more compartment through the weighing scales 104 and transmitting the weighed information to the database 102 via the communication network 108. The one or more processing unit 110 is further configured to monitoring the quantitative value and inventory level of one or more goods placed in the one or more compartments 114 through one or more sensors (not shown in FIG. 1). The one or more processing unit 110 is further configured to display the weighed information and monitored information over the user-computing device 112 communicated through the communication network 112.

The one or more processing unit 110 is further configured to update the database 102 about the number of goods available in stock in each of the compartment 114 every time one or more goods are taken from each of the compartment 114 based on the weight of the compartment 114 obtained from the weighing scales 104 through mathematical calculations. The database 102 may store a set of information related to the transaction such as the identification names or numbers for a good and the quantity requested for that good. The aforementioned information entered into the database 102 by the warehouse managers and other warehouse personnel.

Additionally, the one or more processing unit 110 is configured to determine a minimum weight limit for each of the one or more compartment 114 below which information of the one or more goods in each of the one or more compartment 114 is transmitted to the user-computing device. The one or more processing unit 110 is configured to transmit the information of the one or more goods in each compartment 114 to the user-computing device 112 over a communication network 108 to co-ordinate and update one or more users regarding inventory stock in real-time.

In an embodiment, the database 102 is operable to execute one or more semantic queries to enable implementation of machine-learning techniques. The Database 102 is realized through various technologies such as, but not limited to, Microsoft® SQL Server, Oracle®, IBM DB2®, Microsoft Access®, PostgreSQL®, MySQL® and SQLite®, and the like.

Examples of the user-computing device 112 include, but are not limited to, a personal computer, a laptop, a personal digital assistant (PDA), a mobile device, a tablet, or any other computing device.

A person skilled in the art will understand that the scope of the disclosure should not be limited to monitor the inventory stock through the user-computing device 112 for real-time monitoring of the inventory stock. In an alternate embodiment, inventory apparatus 116 can include a display, such as a touchscreen or other interactive display that is used by a user to monitor supply levels and obtain other information within the compartments 114, such as temperature, humidity, radiation, gases, smoke, movement, etc.

Figure 2:
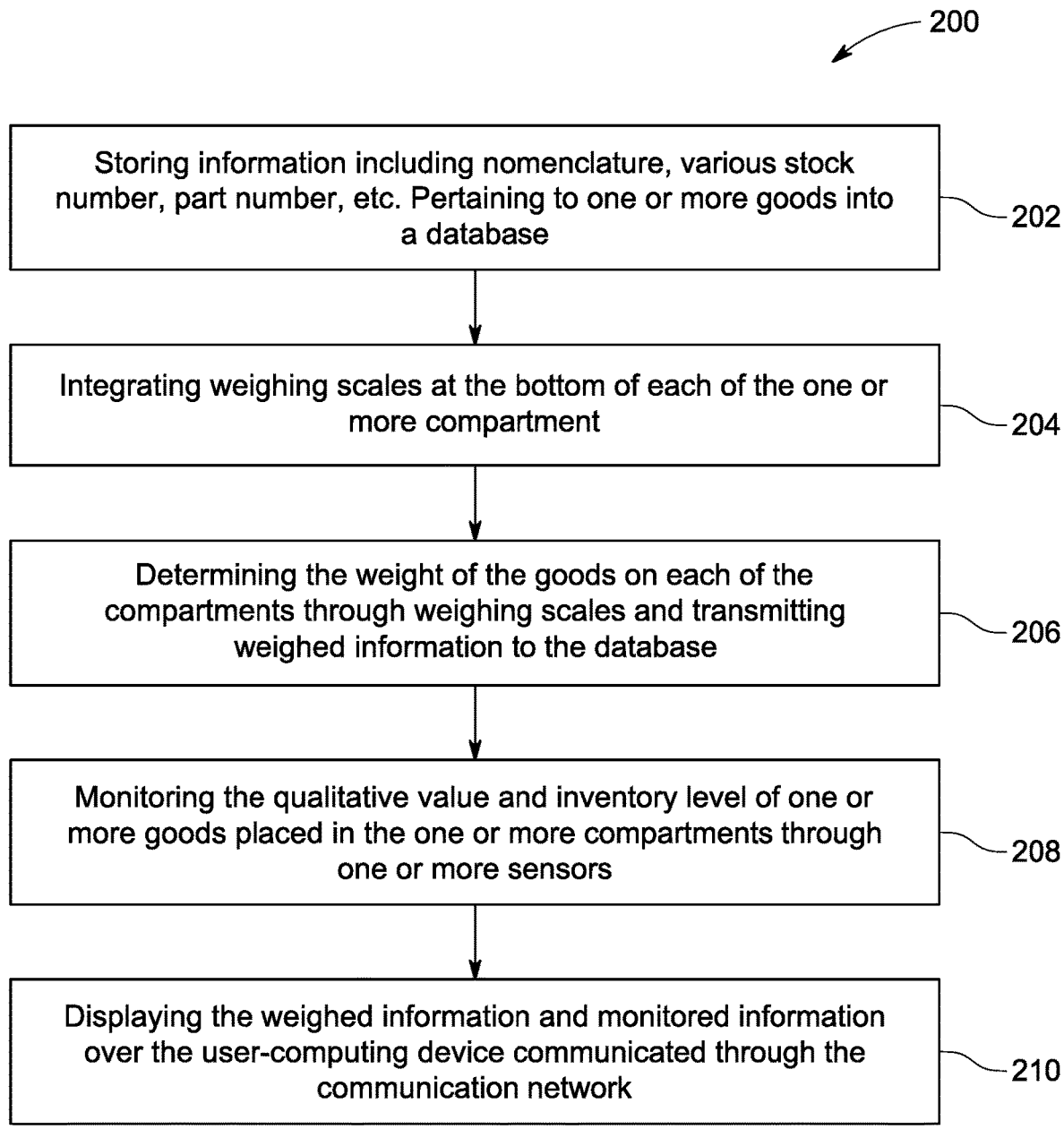
FIG. 2 illustrates a flowchart of a method for monitoring one or more goods placed in plurality of compartments of an inventory apparatus and further communicating the monitored data to a user-computing device via a communication network, in accordance with at least one embodiment.
Figure 3:
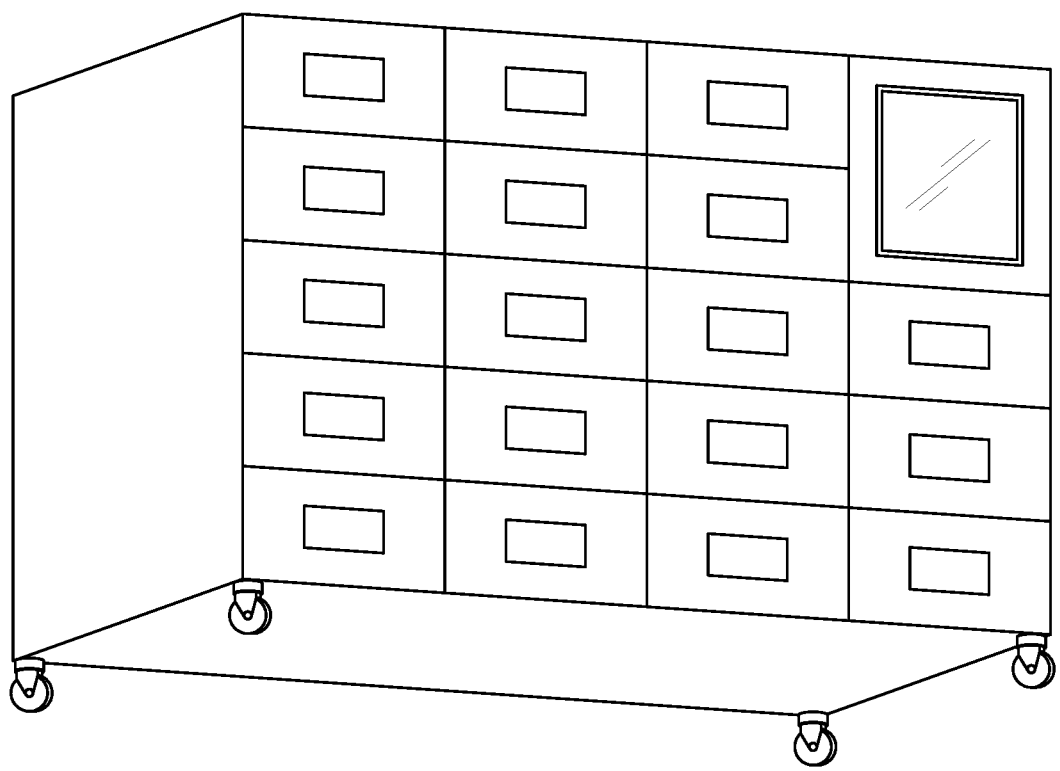
FIG. 3 shows a front isometric view of the present invention on wheels and including a plurality of shelves and a touchscreen display.

FIG. 2 illustrates a flowchart of a method 200 for monitoring one or more goods placed in plurality of compartments 114 of an inventory apparatus 116 and further communicating the monitored data to a user-computing device 112 via a communication network 108. The flow chart 200 is described in conjunction with FIG. 1.

The method starts at step 202 of storing information pertaining to one or more goods into a database. In one embodiment, the information pertaining to one or more goods including, but not limited to, the location of one or more compartment 114 in which the goods are stored, weight of goods, and number of goods available in stock.

The method further includes the step 204 of integrating weighing scales 104 at the bottom of each of the one or more compartment 114. Further, the method includes the step 206 of determining the weight of the one or more goods in each of the one or more compartment 114 through the weighing scales 104 and transmitting the weighed information to the database 102 via the communication network 108. Step 206 is followed by the step 208 of monitoring the quantitative value and inventory level of one or more goods placed in the one or more compartments 114 through one or more sensors.

Further, the method includes the step 210 of displaying the weighed information and monitored information over the user-computing device 112 communicated through the communication network 108.

Additionally, the method may include calculating the number of pieces of one or more goods in each of the one or more compartments based on the weight of the one or more corresponding goods. Furthermore, the method may include determining the weight limit for each of the one or more compartment below which the information about the inventory stock sent to the user-computing device.

In one embodiment, the method may include the step of offering the one or more goods for sale to the one or more customer. Further, the method includes sending alert to the user when the weight of one or more compartments goes below the predetermined limit to co-ordinate and real-time updating one or more users regarding inventory stock.

Various embodiments of the disclosure provide a non-transitory computer readable medium and/or storage medium, and/or a non-transitory machine readable medium and/or storage medium having stored thereon, a machine code and/or a computer program having at least one code section executable by a machine and/or a computer to co-ordinate and update one or more users regarding inventory stock in real-time.

The one or more processing unit 110 is configured to weigh the one or more goods stored in one or more compartments 114 through the weighing scales 104 attached to the bottom of one or more compartment 114 and store the information in the database 102. The one or more processing unit 110 is configured to determine a weight limit for each of the one or more compartment 114 and the system can notify the user if the weight limit is exceeded. The processing unit 110 is further configured to send alert to the one or more users when the weight of the one or more compartment 114 is below the predetermined weight limit. The processing unit 110 is further configured to transmit inventory stock information from the database 102 to the user-computing device 112 through communication network 108 to co-ordinate and update one or more users regarding inventory stock in real-time.

Figure 4:
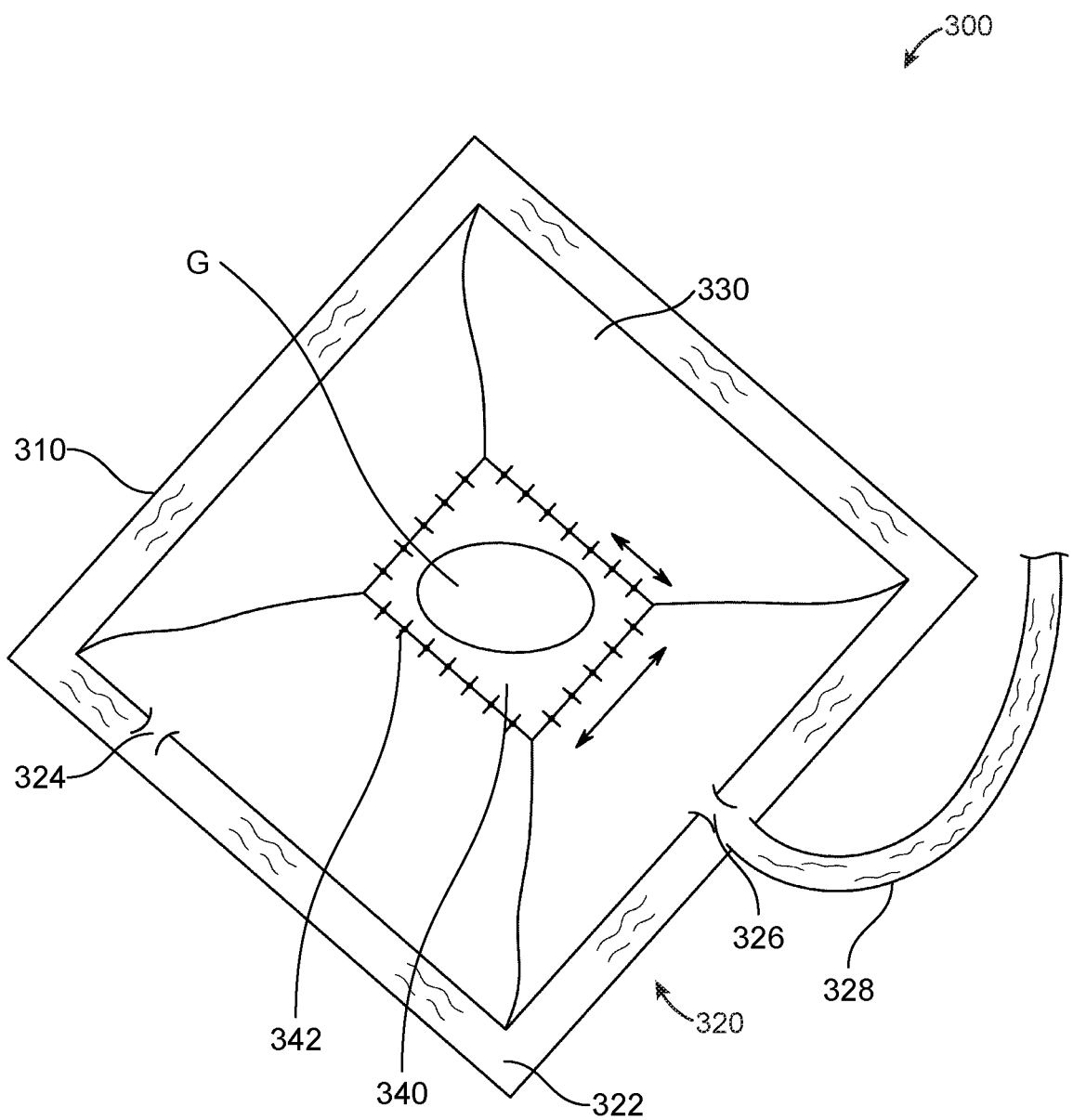
FIG. 4 shows a self-cleaning assembly that can be found within one of the shelves having a secured area where the item is placed. This area can be a recess into the surface of the shelf or it can be a rimmed housing wherein the item is placed. The housing or recessed areas can have a plurality of water dispensers adjacent thereto or mounted thereon that selectively release water to various parts of the surface to clean spills. The water, using the sloped gradient of the surface, is then collected by at least one drainage openings connected to the water flowing along the perimeter of the shelf. The dirty water is then passed through a tube for reclamation by the system or is sent to the sewer.

The self-cleaning assembly 300 is shown in FIG. 4. It is composed of four perimeter side walls 310, a water reclamation system 320, four sloped interior walls 330, and an inner platform shelf 340 that holds goods G. The self-cleaning assembly 300 begins its function when it is time to cleanse an inner platform shelf 340. The plurality of liquid dispensing members 342 release the preconfigured amount of liquid into the inner platform shelf 340 and the cleaning process begins. The liquid flows down the four sloped interior walls 330 afterwards and through either one of the channel openings, first entry 324 or second entry 326 found at the bottom of two of four sloped interior walls 330 and into the water reclamation system 320. The water reclamation system 320 has a channel 322 that runs around the perimeter of the self-cleaning assembly 300 receiving liquid or water through either a first entry 324 or a second entry 326. The liquid or water running through channel 322 of the water reclamation system 320 then exits channel 322 through a tube 328 which leads to a collection tank or sewage system. Additionally, the water reclamation system 320 can have a filtration member in order to separate contaminants from the water or liquid to allow the water or liquid to be recycled and reused.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system for managing inventory, comprising:
an inventory apparatus connected to a server and further including a plurality of compartments, said plurality of compartments include four perimeter side walls, an inner platform shelf entirely raised above said four perimeter side walls and adapted to hold goods, said inner platform shelf having a platform perimeter connected to and raised above said four perimeter side walls using four sloped interior walls, said four sloped interior walls being larger than said goods, said server coupled to a computerized processing unit, each of said plurality of compartments including at least one weighing scale to determine a weight value transmitted to said server, said server further coupled to a database that stores various weight values for various goods, a water reclamation system including a plurality of liquid dispensing members mounted directly on said inner platform shelf along the platform perimeter of said inner platform shelf, said plurality of liquid dispensing members all being on a same plane, said plurality of liquid dispensing members being on a same perimeter side of said inner platform shelf being parallel to each other, said plurality of liquid dispensing members being on adjacent perimeter sides of said inner platform shelf being perpendicular to each other, a channel adapted to have running liquid therethrough, said channel extending entirely within and flush with said four perimeter side walls, each of said four sloped interior walls has a bottom, said channel defined as a spacing between said four perimeter sidewalls and said four sloped interior walls, said channel extending around a perimeter of said four sloped interior walls about said bottom, said channel being below said inner platform shelf, said channel being in contact with said four sloped interior walls at all times, a first entry located at said bottom of one of said four sloped interior walls that is configured to permit liquids and solids to enter said channel, a second entry located at said bottom of a second of said four sloped interior walls configured to permit liquids and solids to enter said channel, said four sloped interior walls and said inner platform shelf defining a substantial pyramid shape.

2. The system of claim 1 wherein said inventory apparatus includes a touchscreen.

3. The system of claim 1 wherein said compartment include a temperature or humidity sensor.

4. The system of claim 1 wherein said compartments include a smoke, radiation, or movement sensor.

5. The system of claim 1 wherein the system alerts users when the weighing scales detect less than a set weight threshold.

6. The system of claim 1 wherein said water reclamation system includes reclaimed water that is collected after leaving said channel and travels on its way back to a collection tank or sewage system.

7. The system of claim 1 wherein said water reclamation system includes a filtration member that separates out the contaminants of the reclaimed water.

* * * * *